US009523491B2

(12) United States Patent
Bailey et al.

(10) Patent No.: US 9,523,491 B2

(45) Date of Patent: Dec. 20, 2016

(54) LED LUMINAIRE HAVING LATERAL COOLING FINS AND ADAPTIVE LED ASSEMBLY

(75) Inventors: Christopher L. Bailey, Palmetto, FL (US); Adam J. Clark, Bradenton, FL (US); Perry Romano, Bradenton, FL (US)

(73) Assignee: Hubbell Incorporated, Shelton, CT (US)

( * ) Notice: Subject to any disclaimer, the term of this patent is extended or adjusted under 35 U.S.C. 154(b) by 1273 days.

(21) Appl. No.: 12/900,159

(22) Filed: Oct. 7, 2010

(65) Prior Publication Data

US 2012/0087118 A1 Apr. 12, 2012

(51) Int. Cl.

| | |
|---|---|
| ***B60Q 1/06*** | (2006.01) |
| ***F21V 29/75*** | (2015.01) |
| ***F21V 29/507*** | (2015.01) |
| ***F21V 29/74*** | (2015.01) |
| *F21S 8/00* | (2006.01) |
| *F21S 8/04* | (2006.01) |
| *F21S 8/08* | (2006.01) |
| *F21V 5/00* | (2015.01) |
| *F21Y 101/02* | (2006.01) |
| *F21Y 105/00* | (2016.01) |

(52) U.S. Cl.

CPC ............ *F21V 29/75* (2015.01); *F21V 29/507* (2015.01); *F21V 29/745* (2015.01); *F21S 8/036* (2013.01); *F21S 8/04* (2013.01); *F21S 8/043* (2013.01); *F21S 8/086* (2013.01); *F21S 8/088* (2013.01); *F21V 5/007* (2013.01); *F21Y 2101/02* (2013.01); *F21Y 2105/001* (2013.01)

(58) Field of Classification Search

CPC .............. F21S 8/036; F21S 8/04; F21S 8/043; F21S 8/086; F21S 8/088; F21V 29/507; F21V 29/745; F21V 29/75; F21V 5/007; F21Y 2101/02; F21Y 2105/001

USPC .................... 362/294, 373, 218, 249.02, 235

See application file for complete search history.

(56) References Cited

U.S. PATENT DOCUMENTS

| | | | | |
|---|---|---|---|---|
| 3,213,270 | A | 10/1965 | Appleton et al. | |
| 3,265,885 | A | 8/1966 | Porter | |
| 3,502,858 | A | 3/1970 | Habro et al. | |
| 3,525,142 | A | 8/1970 | Osborne, Jr. | |
| 3,636,339 | A | 1/1972 | Osborne, Jr. | |
| 3,840,734 | A * | 10/1974 | Oram | 362/267 |
| 4,557,225 | A | 12/1985 | Sagues et al. | |
| 4,849,862 | A | 7/1989 | Diskin et al. | |
| 4,985,815 | A | 1/1991 | Endo | |

(Continued)

*Primary Examiner* — Jong-Suk (James) Lee
*Assistant Examiner* — Tsion Tumebo
(74) *Attorney, Agent, or Firm* — Michael Best & Friedrich, LLP

(57) ABSTRACT

A luminaire including a housing made of thermally conductive material having a top, a bottom and two opposite sides connecting the top to the bottom, each side having plurality of external, vertically spaced, substantially parallel cooling fins that extend longitudinally and project laterally outwardly of the housing, preferably at a shallow downward and outward angle. The housing configuration provides a large surface area per unit of housing length to optimize heat dissipation. A configurable, cartridge-like LED bezel assembly—readily replaceable in the field—is supported on the bottom of the housing. A driver for the LED assembly—also readily replaceable in the field—is located within the housing.

31 Claims, 14 Drawing Sheets

(56) References Cited

U.S. PATENT DOCUMENTS

| | | | |
|---|---|---|---|
| D315,832 S | 4/1991 | Rocheleau et al. | |
| D338,449 S | 8/1993 | Sahyoun | |
| D360,047 S | 7/1995 | Zimmerman et al. | |
| 5,515,254 A | 5/1996 | Smith et al. | |
| D418,626 S | 1/2000 | Herst et al. | |
| D421,147 S | 2/2000 | Herst et al. | |
| D434,519 S | 11/2000 | Herst et al. | |
| D435,310 S | 12/2000 | Herst et al. | |
| 6,305,874 B1 | 10/2001 | Custers et al. | |
| 6,340,868 B1 | 1/2002 | Lys et al. | |
| 6,411,514 B1 * | 6/2002 | Hussaini | 361/704 |
| 6,573,536 B1 | 6/2003 | Dry | |
| 6,720,566 B2 | 4/2004 | Blandford | |
| 6,815,724 B2 | 11/2004 | Dry | |
| 6,831,303 B2 | 12/2004 | Dry | |
| 6,905,214 B2 | 6/2005 | Tani | |
| 7,033,060 B2 | 4/2006 | Dubuc | |
| 7,198,387 B1 | 4/2007 | Gloisten et al. | |
| 7,234,844 B2 | 6/2007 | Bolta et al. | |
| 7,242,028 B2 | 7/2007 | Dry | |
| 7,267,461 B2 | 9/2007 | Kan et al. | |
| 7,288,796 B2 | 10/2007 | Dry | |
| D570,533 S | 6/2008 | Morgan | |
| D574,107 S | 7/2008 | Tress et al. | |
| 7,420,811 B2 | 9/2008 | Chan | |
| D578,696 S | 10/2008 | Wang et al. | |
| 7,438,448 B2 | 10/2008 | Chen | |
| 7,506,995 B2 | 3/2009 | Thomas et al. | |
| D599,940 S | 9/2009 | Zheng | |
| 7,600,908 B2 | 10/2009 | Chang et al. | |
| 7,665,866 B2 | 2/2010 | Mayer et al. | |
| D625,463 S | 10/2010 | Klus | |
| 8,038,327 B1 | 10/2011 | Franck et al. | |
| 2004/0026721 A1 | 2/2004 | Dry | |
| 2004/0141326 A1 | 7/2004 | Dry | |
| 2005/0258439 A1 | 11/2005 | Dry | |
| 2005/0258440 A1 | 11/2005 | Dry | |
| 2005/0269581 A1 | 12/2005 | Dry | |
| 2006/0146531 A1 | 7/2006 | Reo et al. | |
| 2006/0250803 A1 | 11/2006 | Chen | |
| 2006/0262545 A1 | 11/2006 | Piepgras et al. | |
| 2007/0070628 A1 | 3/2007 | Chen | |
| 2007/0086196 A1 | 4/2007 | Wong | |
| 2007/0159827 A1 | 7/2007 | Huang | |
| 2008/0192478 A1 | 8/2008 | Chen | |
| 2008/0273326 A1 | 11/2008 | Wilcox et al. | |
| 2009/0213588 A1 | 8/2009 | Manes | |
| 2009/0251898 A1 | 10/2009 | Kinnune et al. | |
| 2009/0303711 A1 | 12/2009 | Remus et al. | |
| 2010/0118496 A1 * | 5/2010 | Lo | 361/710 |
| 2010/0149809 A1 | 6/2010 | Ruud et al. | |
| 2010/0171404 A1 * | 7/2010 | Liu et al. | 313/46 |
| 2010/0195326 A1 | 8/2010 | Boxler et al. | |
| 2010/0214744 A1 * | 8/2010 | Liang | 361/714 |
| 2010/0220476 A1 * | 9/2010 | Kuo et al. | 362/235 |
| 2010/0238658 A1 * | 9/2010 | Xiang et al. | 362/235 |
| 2010/0254148 A1 * | 10/2010 | Huang et al. | 362/373 |
| 2011/0038153 A1 | 2/2011 | Hu | |

* cited by examiner

LED LUMINAIRE HAVING LATERAL COOLING FINS AND ADAPTIVE LED ASSEMBLY

FIELD OF THE INVENTION

The present invention relates to luminaires, in particular, to luminaires that incorporate light emitting diodes (LEDs) as a light source.

BACKGROUND OF THE INVENTION

Increased luminous efficacy of LEDs and advancements in LED optical systems have made LED light sources a sensible choice for providing general illumination for outdoor areas such as streets, pathways, plazas and parking lots, and for large covered areas such as parking structures, underpasses and transit platforms. While LEDs generate less heat than incandescent light sources, the heat generated in "high power" LED luminaires can be substantial and must be dissipated in order to keep the LEDs cool enough so that they operate within a desired efficiency range, do not degrade and do not fail prematurely.

Heat dissipation usually is by conduction from the LEDs to a heat sink having heat dissipating elements, such as cooling fins. Vertically oriented cooling fins atop a luminaire housing enhance heat dissipation, but the spaces between the cooling fins tend to accumulate dirt and debris, as well as ice and snow during winter in colder climates. Such accumulations can reduce the heat dissipating efficiency of the cooling fins, potentially reducing LED efficiency and longevity. Placing screening or perforated sheet metal over the cooling fins in an effort to minimize or prevent such accumulations can be counterproductive because such coverings can reduce the heat dissipating efficiency of the cooling fins. Top-mounted cooling fins also preclude flush mounting of the luminaire to an overhead support surface, such as a ceiling.

Servicing of many existing luminaire designs, such as replacing LEDs, optical components or electrical components, can be rather cumbersome and/or time-consuming. This activity typically involves dismounting the entire luminaire, removing it to a workbench for servicing and then reinstalling it, or spending substantial time on a ladder or other elevated work platform disassembling the luminaire, replacing parts and reassembling the unit, all in situ.

SUMMARY OF THE INVENTION

The invention addresses the above and other drawbacks of the prior art by providing a luminaire that has, inter alia, laterally extending, efficient cooling fins that are not prone to clogging with dirt, debris, snow or ice, and a cartridge-like LED bezel assembly that is readily replaceable in the field.

According to one aspect, the invention is directed to a luminaire housing made of thermally conductive material and comprising a top, a bottom and two opposite sides connecting the top to the bottom. Each side of the housing comprises at least three external, vertically spaced, substantially parallel cooling fins that extend longitudinally and project laterally outwardly of the housing. Each cooling fin terminates laterally in a distal edge and has a reach defined by the lateral distance of its distal edge from the medial longitudinal vertical plane of the housing. The reaches of a group of at least three consecutive cooling fins of each side are nonuniform.

The reaches of the cooling fins of the group preferably increase progressively from the top cooling fin of the group to the bottom cooling fin of the group. It is also preferred that each of the cooling fins of the group slopes downwardly and outwardly toward its distal edge. The lateral cantilevered length of each of the cooling fins of the group preferably is greater than the space between the cooling fins of the group, preferably by a ratio in the range of about 2:1 to about 8:1.

The overall height of the housing preferably is about one-third the span between the distal edges of a pair of cooling fins on opposite sides having the greatest reach. The top and the bottom of the housing preferably are substantially flat. It is also preferred that the top of the housing, the bottom of the housing, the two opposite sides of the housing and the cooling fins are integrally formed as a unit, such as an extrusion.

According to another aspect, the invention is directed to a luminaire housing made of thermally conductive material and comprising a top wall, a bottom wall and two opposite side walls connecting the top wall to the bottom wall. Each side wall has a plurality of external, vertically spaced cooling fins that extend longitudinally and project laterally outwardly of the housing. Each cooling fin terminates laterally in a distal edge and has a lateral cantilevered length. The cantilevered length of the longest cooling fin on each side is about two-thirds the overall height of the housing.

The housing top wall, bottom wall and opposed side walls define a housing core having a mean external width, which is the average of the widest and the narrowest external dimensions of the core measured normal to the medial longitudinal plane of the housing. It is preferred that the cantilevered length of the majority of the cooling fins on each side wall is at least about 35% of the mean external width of the housing core. It is also preferred that the cantilevered length of the longest cooling fin on each side wall is about 45% of the mean external width of the housing core, and about 23% of the overall width of the housing.

According to a third aspect, the invention is directed to a luminaire housing made of thermally conductive material and comprising a top wall, a bottom wall and two opposite side walls connecting the top wall to the bottom wall and defining a housing core. Each side wall has a plurality of external, vertically spaced cooling fins that extend longitudinally and project laterally outwardly of the housing. Each cooling fin terminates laterally in a distal edge and has a lateral cantilevered length. The ratio of the total of the cantilevered lengths of all of the cooling fins to the perimeter of the housing core preferably is about 1.7:1.

According to a fourth aspect, the invention is directed to a luminaire housing made of thermally conductive material and comprising a top wall, a bottom wall and two opposite side walls connecting the top wall to the bottom wall. Each side wall has a plurality of external, vertically spaced cooling fins that extend longitudinally and project laterally outwardly of the housing. The total thickness of the cooling fins on each side wall is not more than about 30% of the overall height of the housing. A medial group of cooling fins on each side wall preferably have substantially the same thickness and are substantially uniformly spaced; and the ratio of the space between the cooling fins of each of said medial groups to the thickness thereof is at least about 2.9:1.

According to a fifth aspect, the invention is directed to a luminaire housing made of thermally conductive material and comprising a top wall, a bottom wall and two opposite side walls connecting the top wall to the bottom wall. Each side wall has a plurality of external, vertically spaced cooling fins that extend longitudinally and project laterally outwardly of the housing. Each cooling fin terminates laterally in a distal edge and has a lateral cantilevered length. The ratio of the overall height of the housing to the overall width of the housing is about 1:3. Some of the fins on each side preferably have different cantilevered lengths, the top wall is shorter than the bottom wall, and the top wall and the bottom wall are substantially flat.

As to each of the above aspects, a functional luminaire according to the invention further includes a downwardly facing light emitting diode assembly supported on the bottom of the housing, and a driver within the housing electrically coupled to the light emitting diode assembly.

According to a sixth aspect, the invention is directed to a luminaire comprising a housing made of thermally conductive material, which has a top, a bottom and two opposite sides connecting the top to the bottom, each side having a plurality of external, vertically spaced cooling fins that extend longitudinally and project laterally outwardly of the housing; a downwardly facing light emitting diode (LED) assembly supported on the bottom of the housing; and a driver assembly within the housing electrically connected to the LED assembly and removably supported by the sides of the housing above the bottom thereof. The driver assembly preferably is slidably received in and supported by two longitudinally extending internal grooves, one on each side of the housing. Further, an end cap preferably is provided at each end of the housing and is configured to cover ends of the top, the bottom, the sides and the cooling fins, at least one of the end caps being removable.

According to a seventh aspect, the invention is directed to a light emitting diode (LED) assembly for mounting to a luminaire housing. The LED assembly comprises a circuit board having an array of LEDs on a front face thereof, and an array of lenses corresponding to the array of LEDs, each lens covering a respective LED. Each lens has a flange that abuts the front face of the circuit board. A gasket adjacent the lenses has an array of gasket apertures corresponding to the array of lenses, each lens extending through a respective gasket aperture with the gasket material surrounding the lens abutting the flange thereof. A bezel adjacent the gasket is secured to the circuit board and has an array of bezel apertures corresponding to the array of lenses, each lens extending through a respective bezel aperture.

A plurality of assembly fasteners holds the bezel, the gasket, the lenses and the circuit board together. The assembly fasteners preferably comprise a plurality of threaded standoffs and a plurality of mating screws. The standoffs are secured to the circuit board, extend through respective standoff holes in the gasket and are engaged by the screws, which pass through holes in the bezel. The standoffs preferably fit within the screw holes in the bezel, and the heads of the screws or washers thereon retain the bezel on the standoffs. The LED assembly can be mounted to the bottom of a luminaire housing by means of separate mounting screws that pass through aligned holes in the bezel, the gasket and the circuit board. Spacers between the circuit board and the bezel fix the relative positions thereof when the mounting screws are tightened down.

Additional features and advantages of the invention will be apparent from the following detailed description.

BRIEF DESCRIPTION OF THE DRAWING FIGURES

Preferred embodiments of the invention are described in detail below, purely by way of example, with reference to the accompanying drawing, in which.

DETAILED DESCRIPTION OF THE INVENTION

Figure 1:
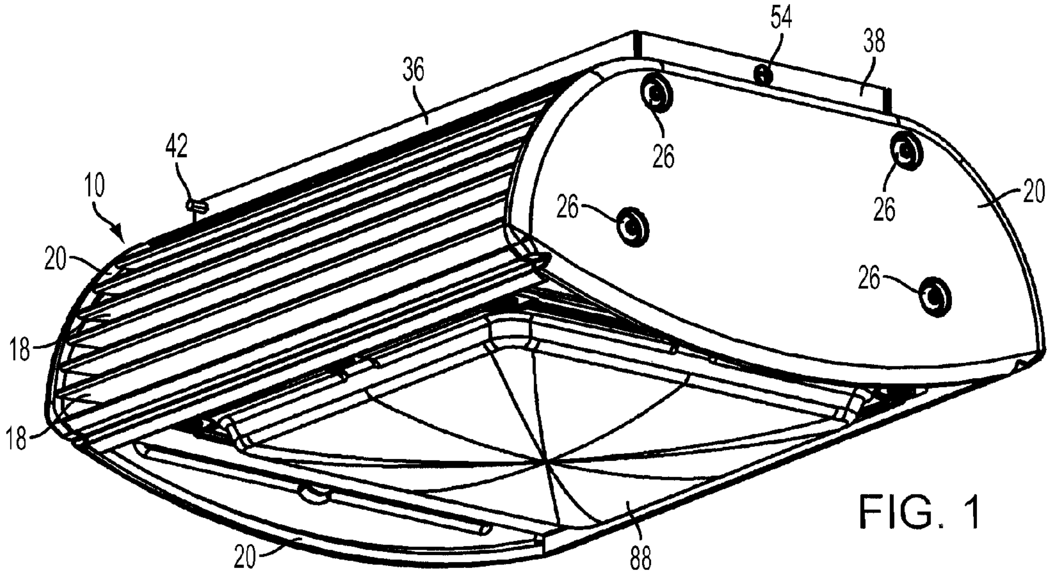
FIG. 1 is a perspective view of a first embodiment of a luminaire according to the invention.
Figure 2:
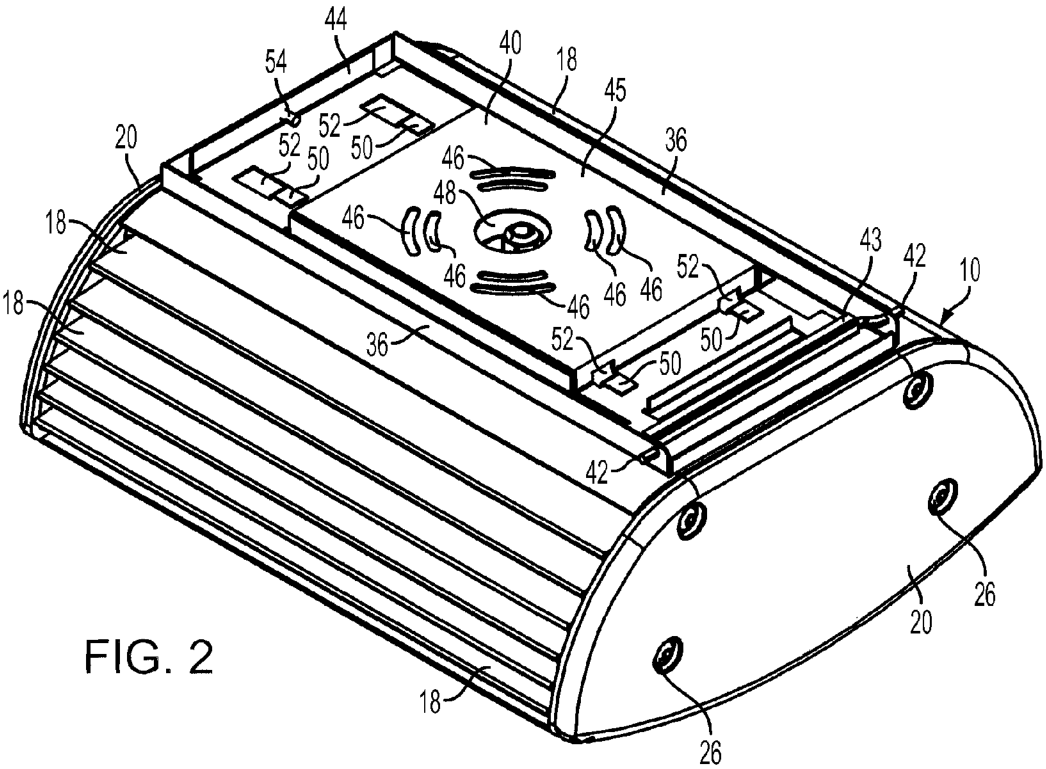
FIG. 2 is another perspective view of the luminaire of FIG. 1.
Figure 3:
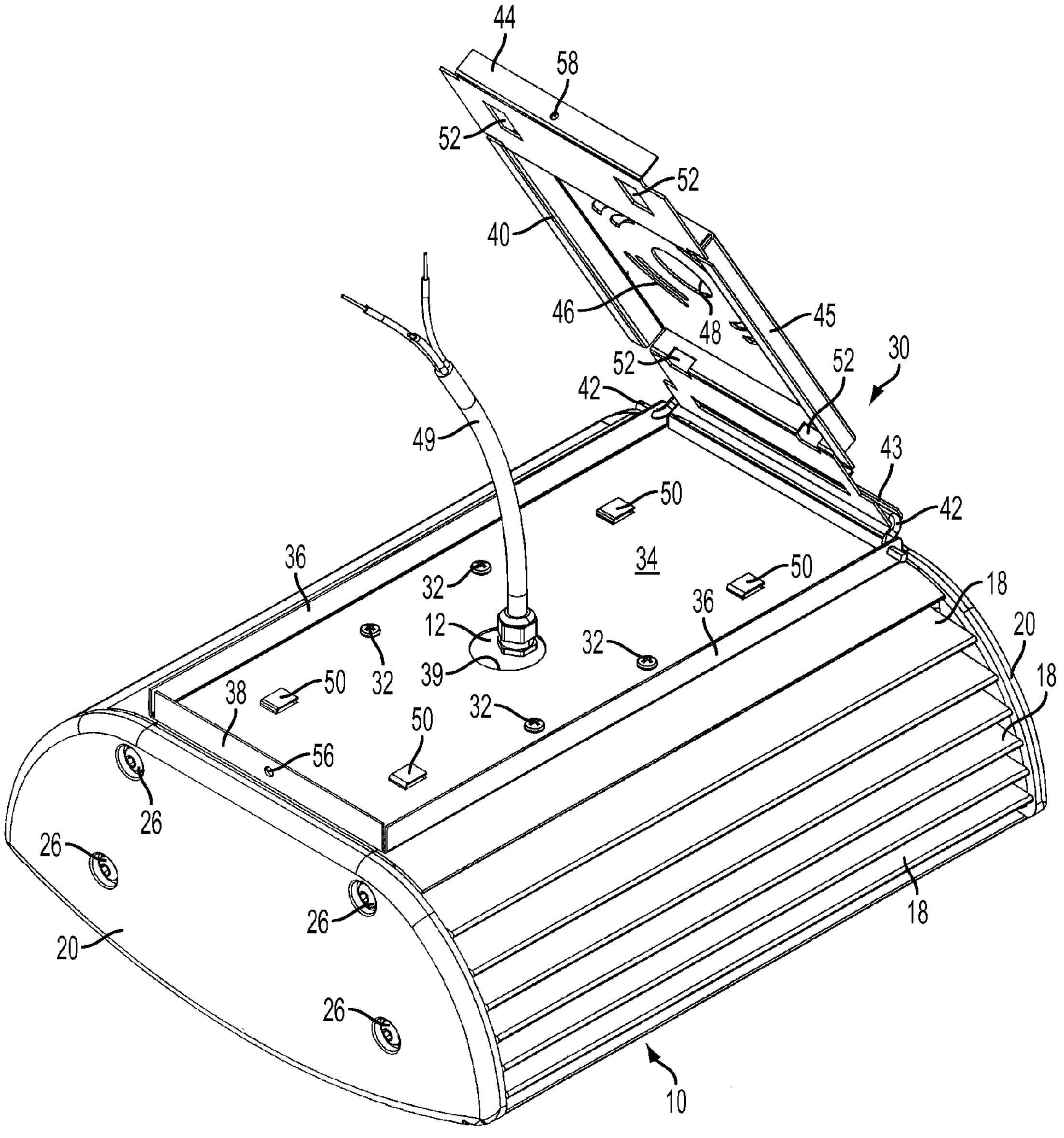
FIG. 3 is a further perspective view of the luminaire of FIG. 1 showing a mounting component in an alternate position.

Referring to FIGS. 1-5, a luminaire according to a first embodiment of the invention comprises a housing 10 having a top wall 12, a bottom wall 14 and two opposite side walls 16 interconnecting the top wall and the bottom wall and together defining a housing core. The housing core has a mean external width, which is defined herein as the average of the widest and the narrowest external dimensions of the core measured normal to the medial longitudinal plane of the housing. The underside of bottom wall 14 has two spaced, parallel rails 15 that define between them a space for mounting an LED engine (light source). Each side wall 16 has a plurality of longitudinal cooling fins 18 that extend laterally outwardly and generally horizontally, preferably with a slight downward slope. Housing 10 is made of a heat-dissipating material, preferably 6063-T6 aluminum alloy, and its walls 12, 14 and 16 and cooling fins 18 preferably are formed as a one-piece unit, preferably as an extrusion. The open ends of housing 10 are closed by flat end caps 20 (preferably die-cast), each secured with an interposed gasket 22 by four lock washers 24 and four screws 26 received in holes 28 in side walls 16.

Figure 20:
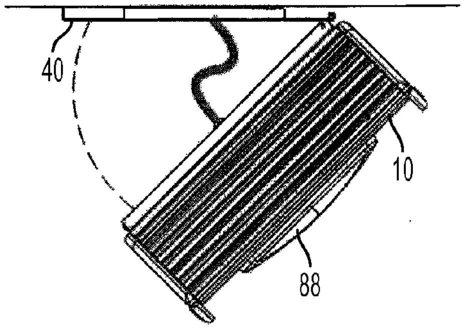
FIG. 20 is a side elevational view of the luminaire of FIG. 1 flush-mounted to a ceiling.
Figure 21:
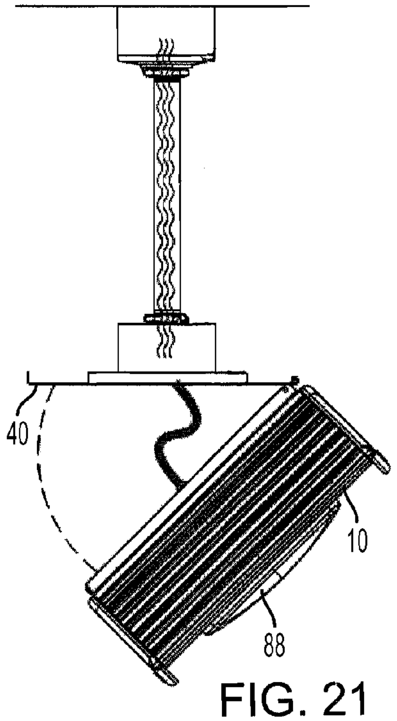
FIG. 21 is a side elevational view of the luminaire of FIG. 1 mounted to a ceiling via a stem and canopy adapters.

A top mount assembly 30 is secured to the top wall 12 of the housing by four screws 32 extending through holes in a base plate 34. The base plate has upstanding side flanges 36 and an upstanding front flange 38. A bent hinge rod 42 is pivotally connected to side flanges 36 at the rear end of the base plate 34. An upper bracket 40 has a rear channel 43 in which hinge rod 42 is removably received, an upstanding front flange 44, and a raised center section 45 with a standard set of arcuate slots 46 for mounting the luminaire to an overhead support, such as a standard single-gang ceiling junction box (see FIG. 20) or a pendant-mounted plate (see FIG. 21). A central opening 39 in base plate 34, an opening 48 in upper bracket 40 and a hole 47 in housing top wall 12 accommodate a power cord 49.

Installation of the luminaire is facilitated by the ability to disengage hinge rod 42 from channel 43, which allows upper bracket 40 to be mounted to the overhead support independently. Thereafter, hinge rod 42 (with luminaire attached) is simply placed into channel 43 in upper bracket 40, assuming the dropped position shown in FIG. 20 (flush mount) and FIG. 21 (pendant mount). Base plate 34 has four rear-facing raised tabs 50, and upper bracket 40 has four windows 52 spaced and sized to accommodate tabs 50 when the housing 10 is pivoted upward and moved aft toward the hinge. The base plate preferably is secured to the mounting plate with a locking screw 54 engaging aligned holes 56, 58 in respective front flanges 38, 44. Locking screw 54 preferably is captive to flange 38 to guard against loss when not fastened to flange 44.

Within housing 10 is an electrical assembly 60 for powering the LED engine, which is mounted to the underside of housing bottom wall 14 between spaced rails 15. Electrical assembly 60 comprises a removable, preferably aluminum component tray 62 supported above bottom wall 14 in longitudinal grooves 64 in side walls 16. When either end cap 20 is removed, component tray 62 is exposed and may be removed without the use of tools. An integral handle 66 at the front end of the tray facilitates sliding movement of tray 62 through that end. Component tray 62 supports one or more electronic drivers 68 secured by screws 70, a ballast surge protector 72 and other components (e.g., a step-down transformer) as needed. Power cord 49 supplies power to these components. Suitable electrical conductors (not shown) supply power from the driver(s) to the LEDs via apertures (not shown) in tray 62 and in housing bottom wall 14. The two drivers 68 can power two independently switched circuits that feed different LEDs, allowing for three different modes of operation.

Figure 4:
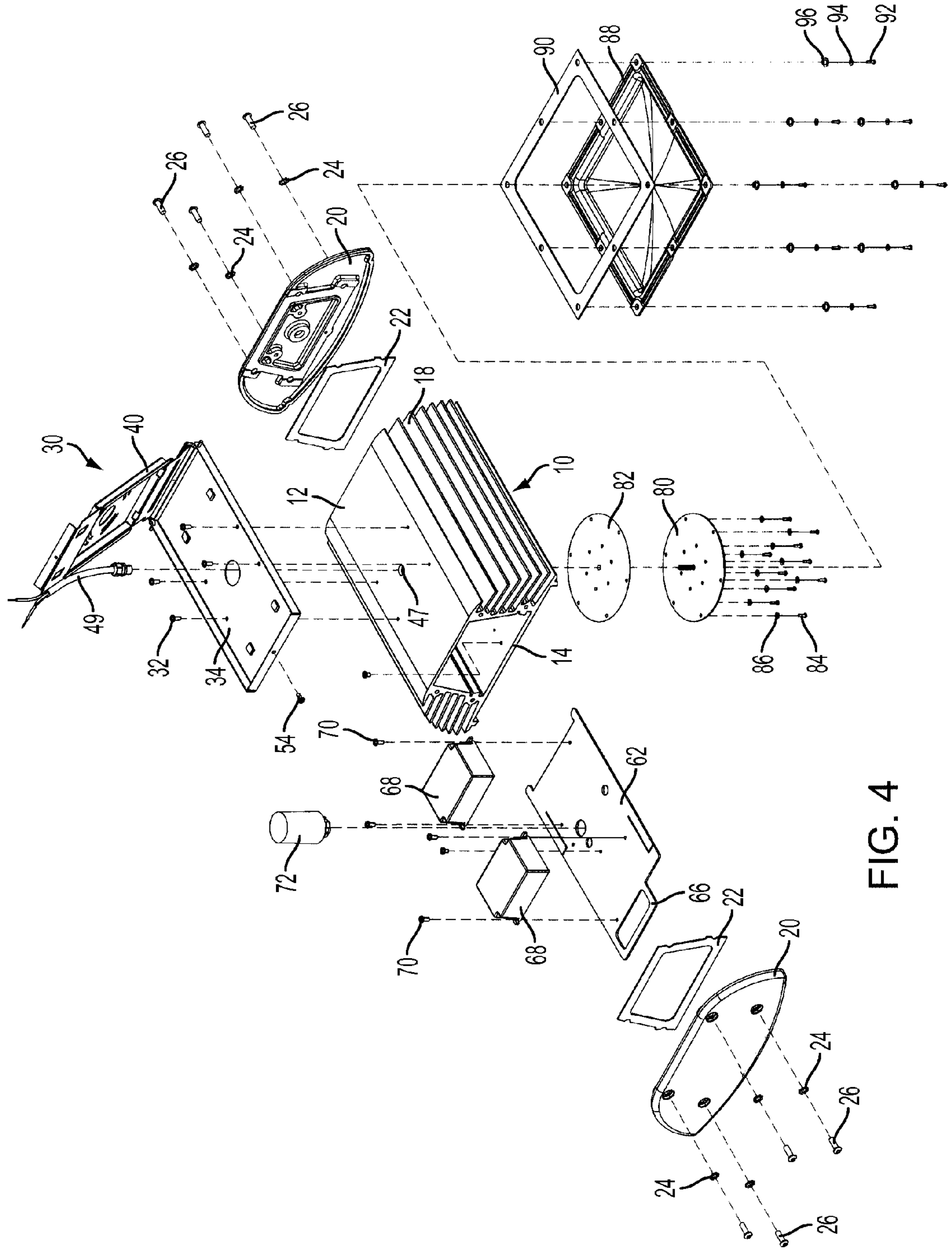
FIG. 4 is an exploded view of the luminaire of FIG. 1.

Referring to FIG. 4, the LED engine comprises a round circuit board 80 and an array of LEDs covered by acrylic refractive lenses (not shown) mounted on the bottom of the circuit board. An example of a suitable LED for the luminaires disclosed herein is the XLamp® XP-E LED of Cree, Inc. Circuit board 80 and an interposed round, thermally conductive pad (thermal pad) 82 are secured to housing bottom wall 14 by a plurality of screws 84 and washers 86. Thermal pad 82 preferably is a 0.005 in. thick composite of aluminum foil sandwiched between two layers of sil-pad rubber, such as the Q-Pad®3 product of The Berquist Company. Alternatively, a layer of thermally conductive grease can be applied between the circuit board and the housing. A circuit board of different shape may be used, such as the square circuit board of the alternate embodiment described below. The LED engine is protected by a convex acrylic lens 88 and a gasket 90 secured to housing bottom wall 14 by a plurality of screws 92, flat washers 94 and shoulder washers 96.

An alternative LED engine arrangement is depicted in FIGS. 6-14. This arrangement is in the form of a cartridge that can be manufactured in a clean room environment as an environmentally sealed subassembly. Cartridges can be made with a variety of LED arrays and taken out of inventory for installation on luminaire housings on the assembly line. The cartridge can be removed easily in the field and replaced with a cartridge having the same or a different array of LEDs, as needed, without the risk of contaminating or damaging the LEDs, the lenses or the board circuitry.

Figure 6:
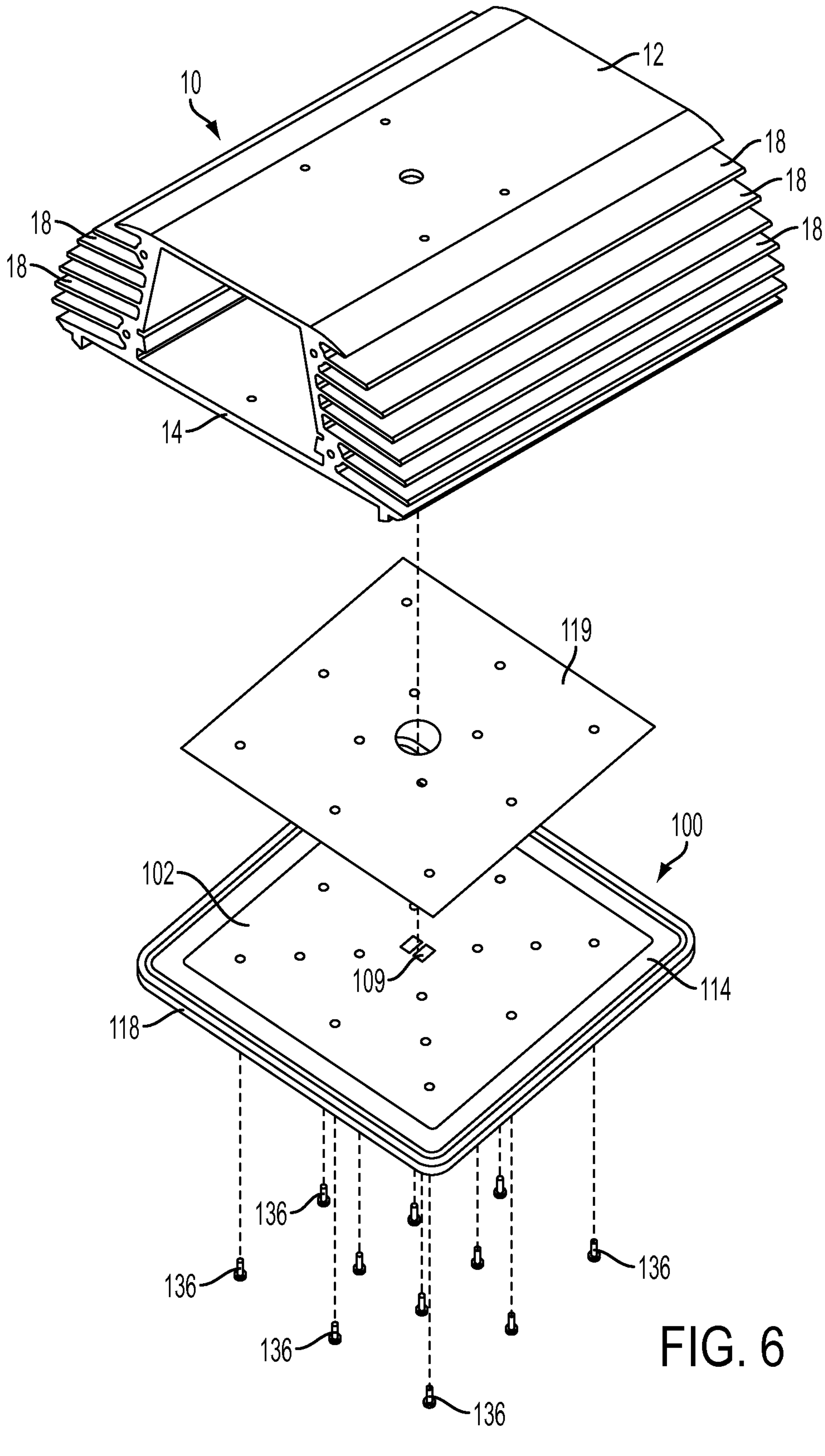
FIG. 6 is an exploded view of a second embodiment of a luminaire according to the invention.
Figure 7:
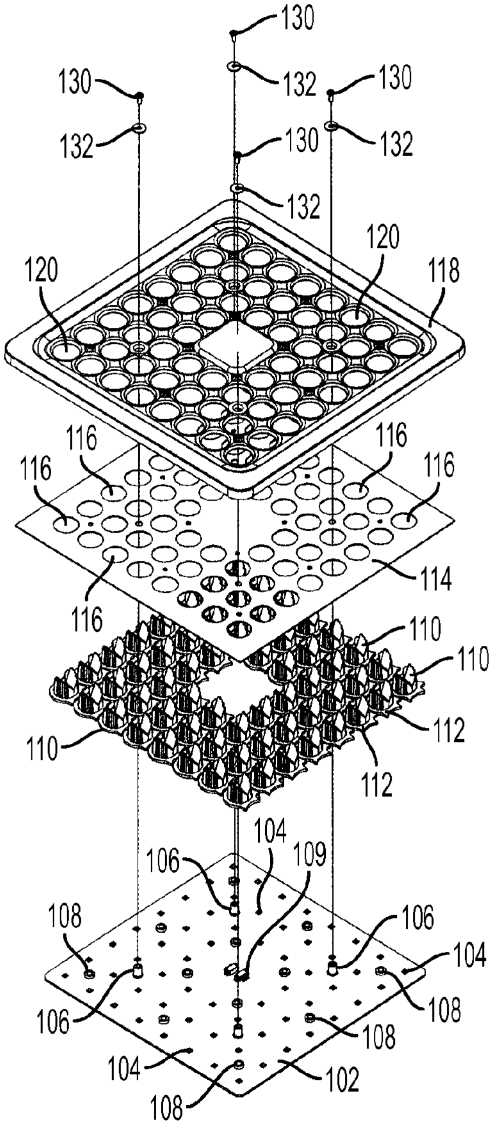
FIG. 7 is an inverted exploded view of the LED and optics assembly of the luminaire of FIG. 6.
Figure 8:
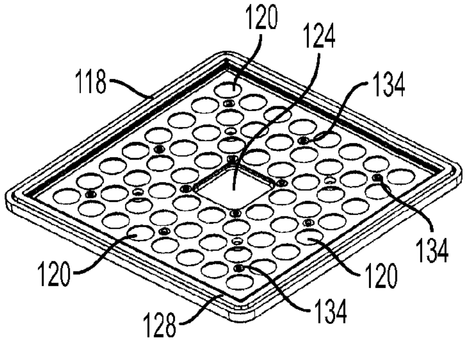
FIG. 8 is an inverted perspective view of the bezel component of the LED and optics assembly of FIG. 7.

Referring to FIGS. 6-8, LED cartridge 100 preferably is square and comprises an LED circuit board 102, optics (lenses) 110, gasketing 114 and an aluminum bezel 118. A square thermal pad 119, preferably made of the same material as thermal pad 82 of the first embodiment, is interposed between housing bottom wall 14 and circuit board 102 when the LED cartridge 100 is installed on the housing 10.

Circuit board 102 has an array of sixty LEDs 104 mounted on its underside (visible in the inverted view of FIG. 7). Circuit board 102 also has four threaded standoffs 106 and twelve shorter, unthreaded standoffs 108. Standoffs 106, 108 preferably are soldered to the circuit board but could be secured by other means, such as a broaching press-in insert. Circuit board 102 further has a quick-disconnect coupling 109 for electrical connection to the driver(s) 68 in housing 10.

Figure 13:
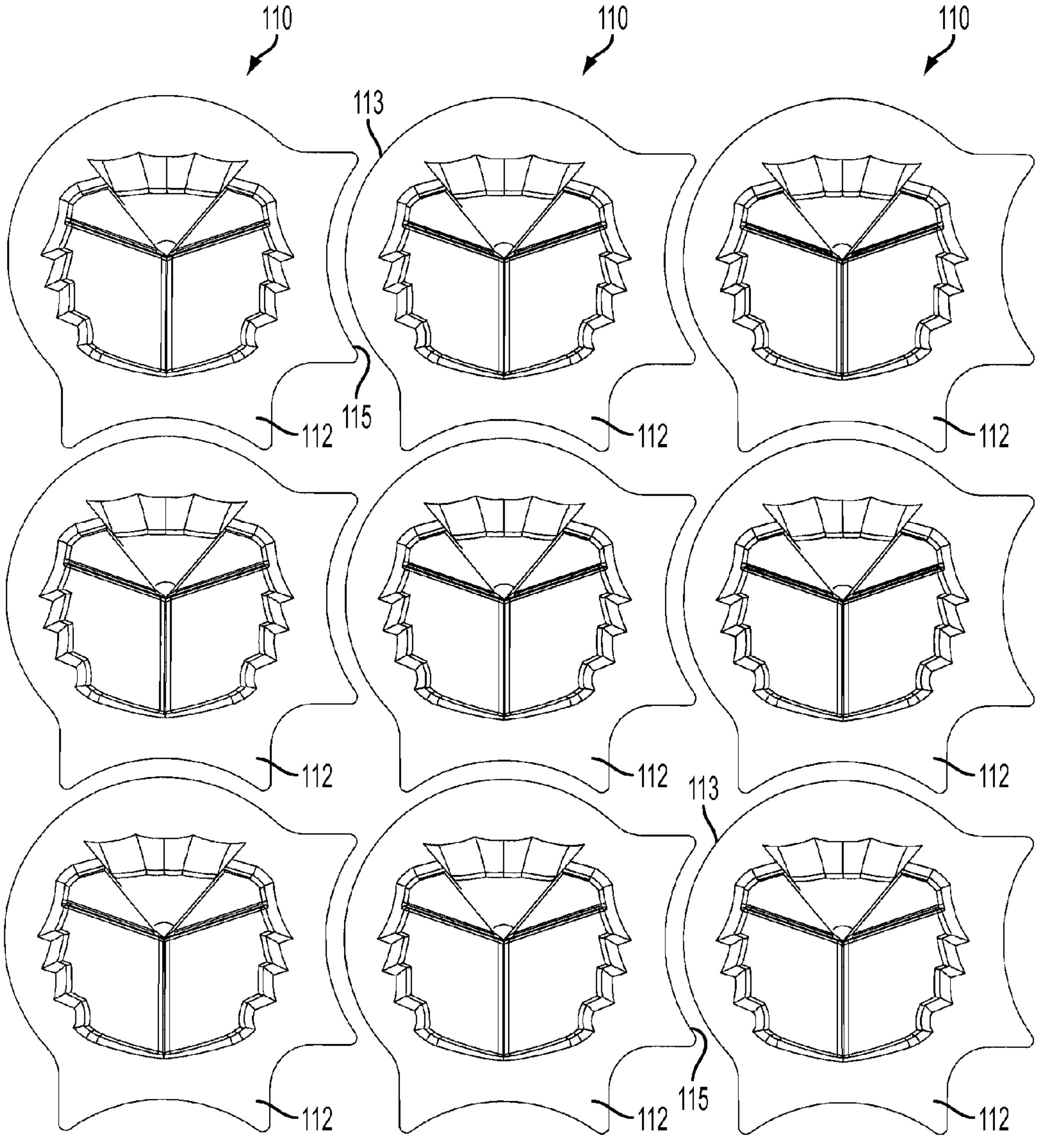
FIG. 13 is a bottom plan detail view of a corner portion of the optics of the first configuration of FIG. 12.
Figure 15:
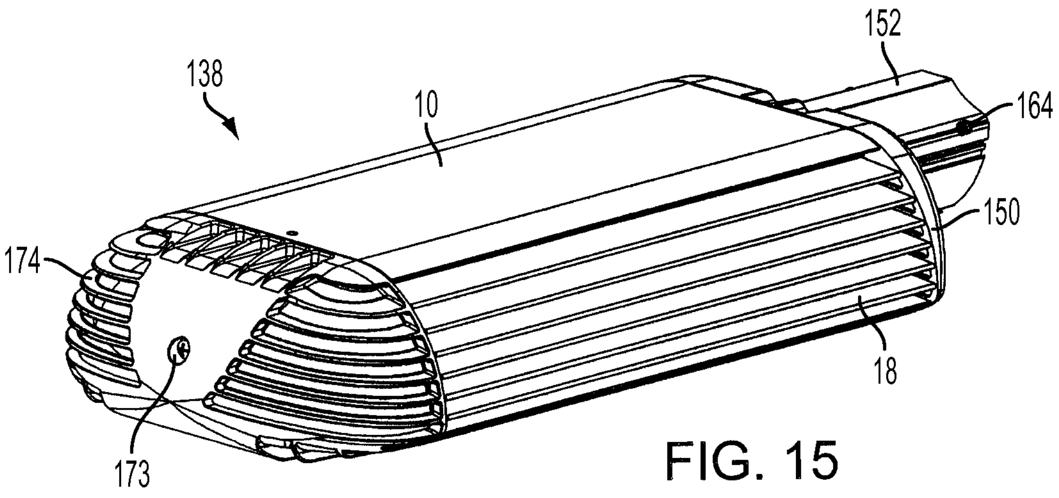
FIG. 15 is a perspective view of a third embodiment of a luminaire according to the invention.
Figure 16:
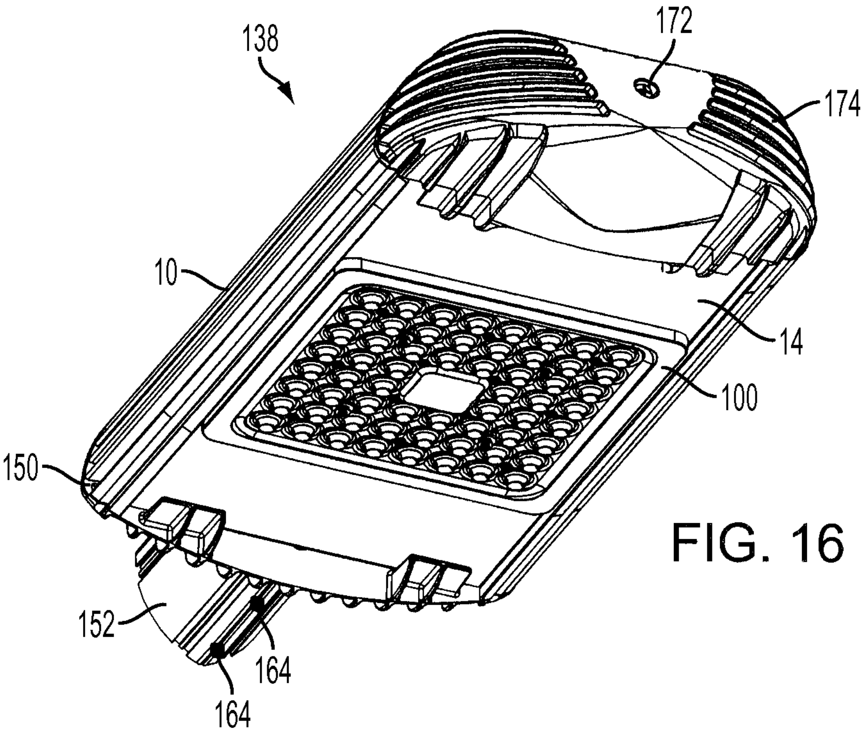
FIG. 16 is another perspective view of the luminaire of FIG. 15.
Figure 17:
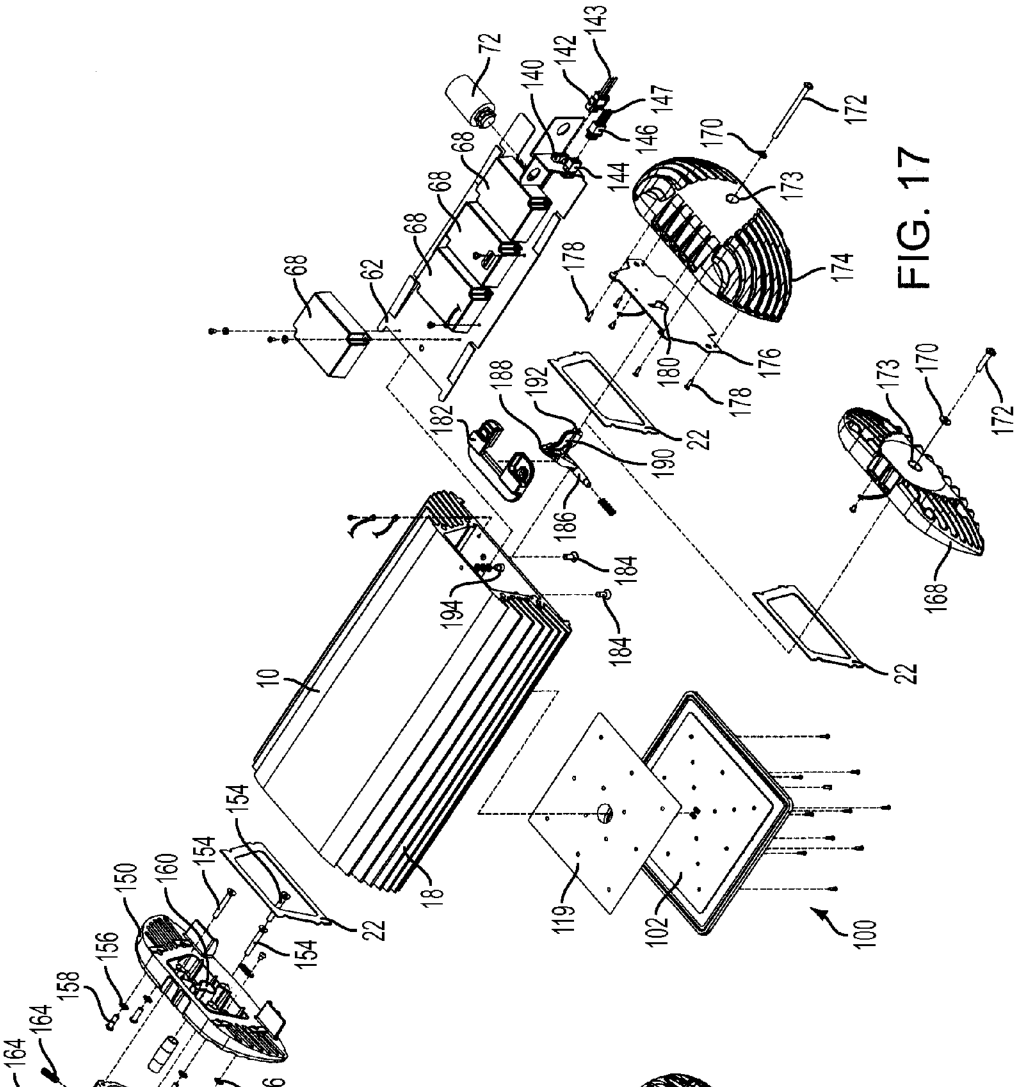
FIG. 17 is an exploded view of the luminaire of FIG. 15.
Figure 18:
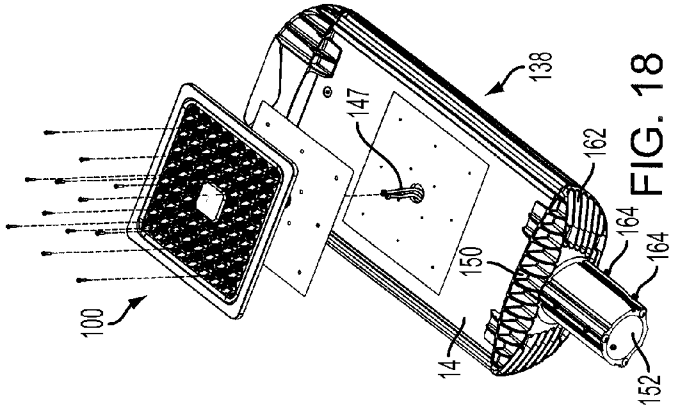
FIG. 18 is a partially exploded view of the luminaire of FIG. 15.
Figure 19:
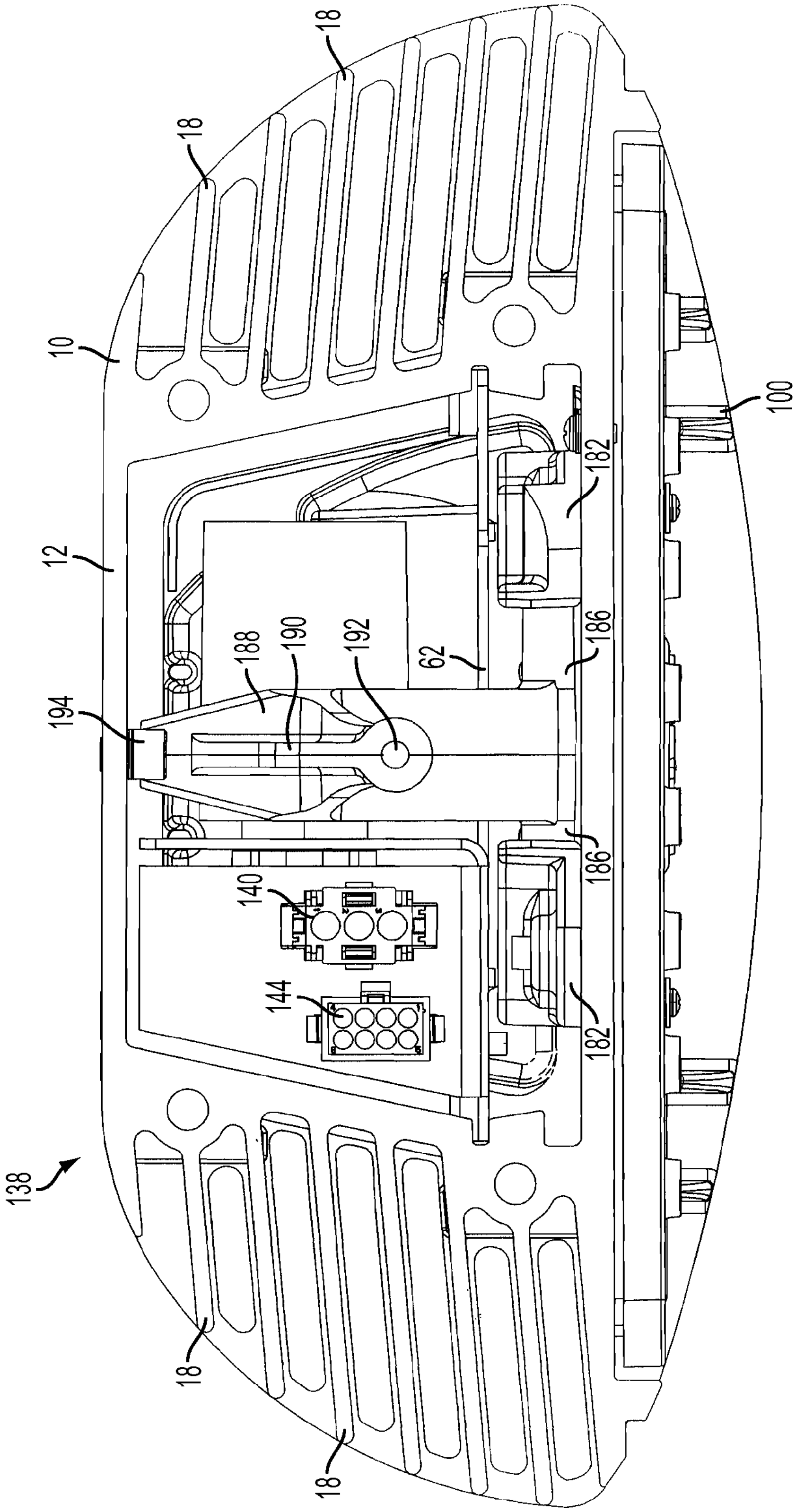
FIG. 19 is an end elevational view of the luminaire of FIG. 15 with one end cap thereof removed.

LEDs 104 are covered by a matching array of sixty refractive lenses 110, which abut circuit board 102. Lenses 110 preferably are made of optical grade acrylic, but other suitable materials can be used, such as polycarbonate or glass. The interior cavity of each lens fits closely around its LED lamp to maintain proper alignment (concentricity). Some or all of lenses 110 may be directional, i.e., designed to concentrate light output within a desired arc or area. In that case, the optic flange 112 of each directional lens has a periphery configured to complement the flange peripheries of adjacent directional lenses so as to require placement of each lens in the proper orientation during assembly. FIG. 13 illustrates a preferred directional flange configuration having complementary convex and concave circular peripheral portions 113, 115. Other complementary flange configurations would also suitably serve to ensure proper lens orientation for a desired light distribution.

Gasket 114 is a compliant material interposed between bezel 118 and lenses 110 to ensure that the lenses are secured adequately and uniformly by being pressed against the circuit board 102. In the preferred embodiment, this material also functions as a seal between bezel 118 and the optic flanges 112 and is preferably made of silicone foam, which possesses superior compression set, aging, and thermal resistance. A single gasket can be used, cut from a sheet with apertures 116 to fit around all lenses in the assembly. During assembly, gasket 114 is simply draped over the lenses and therefore requires no backing or adhesive for proper mounting. Dispensing with adhesives in this area simplifies assembly and avoids reliance on a bond that could degrade over time due to exposure to extreme cold and hot temperatures and to the different rates of thermal expansion of the diverse bezel and lens materials during normal heating and cooling cycles. Adhesives may also cause damage to the LED lamps by damaging the LED encapsulates, possibly compromising LED life and performance.

A continuous lip 126 on the underside of bezel 118 (see FIG. 14) surrounds the circuit board 102 and compresses gasket 114 against housing bottom wall 14 when installed to effect a seal at the perimeter of the LED cartridge. An optional secondary perimeter gasket 128 can be incorporated as a perimeter seal to supplement the primary gasket 114 if gasket 114 extends well beyond the edges of the circuit board, or in place of gasket 114 at the perimeter if gasket 114 is cut smaller.

The purpose of bezel 118 is to mechanically secure lenses 110, to conceal and protect the LED circuit board 102 by sealing it from the elements, and to present a finished, aesthetically pleasing look to the assembly. The bezel could be made from a variety of metal and polymer materials and with manufacturing processes such as casting, molding or cutting sheet stock. The preferred bezel material is die-cast aluminum, which is inherently more rigid and dimensionally more stable than plastic alternatives, and enables incorporation of a high level of detail in the design while maintaining a smooth surface finish and tight tolerances. The bezel preferably is finished with a reflective coating, such as bright anodization or white or silver paint, in order to help salvage any LED light that may impinge on the bezel.

Figure 9:
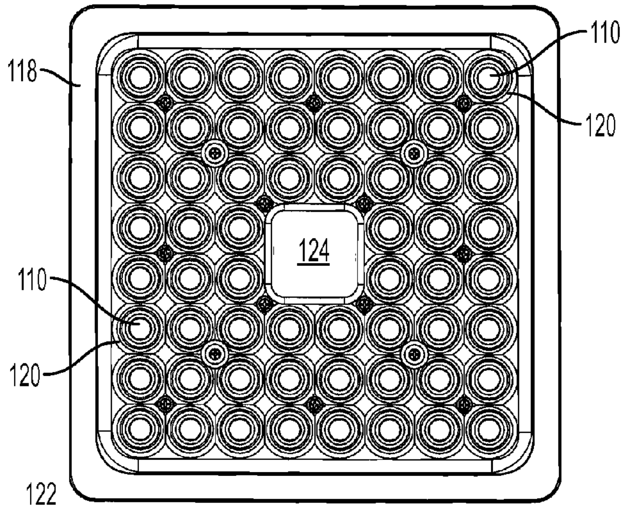
FIG. 9 is a bottom plan schematic view of the LED and optics assembly of FIG. 7 having a first configuration of LEDs.
Figure 10:
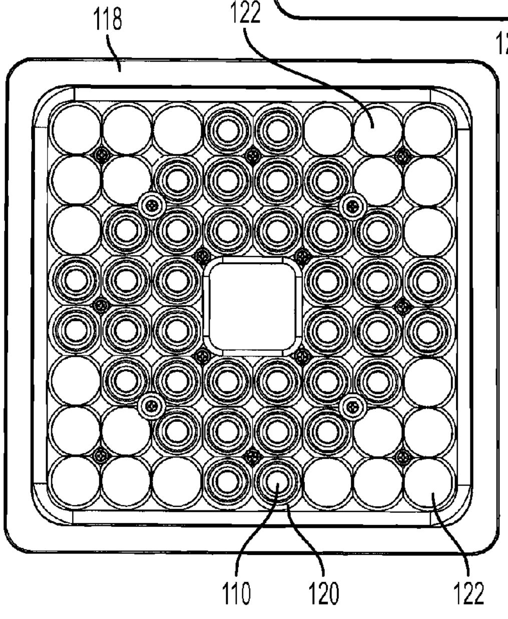
FIG. 10 is a bottom plan schematic view of the LED and optics assembly of FIG. 7 having a second configuration of LEDs.
Figure 11:
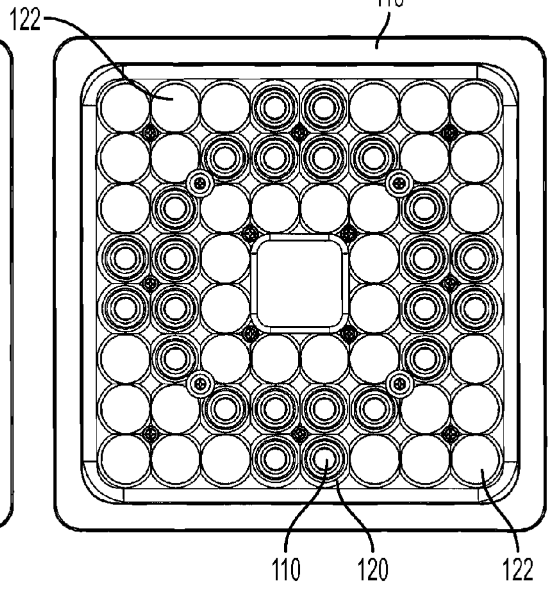
FIG. 11 is a bottom plan schematic view of the LED and optics assembly of FIG. 7 having a third configuration of LEDs.
Figure 12:
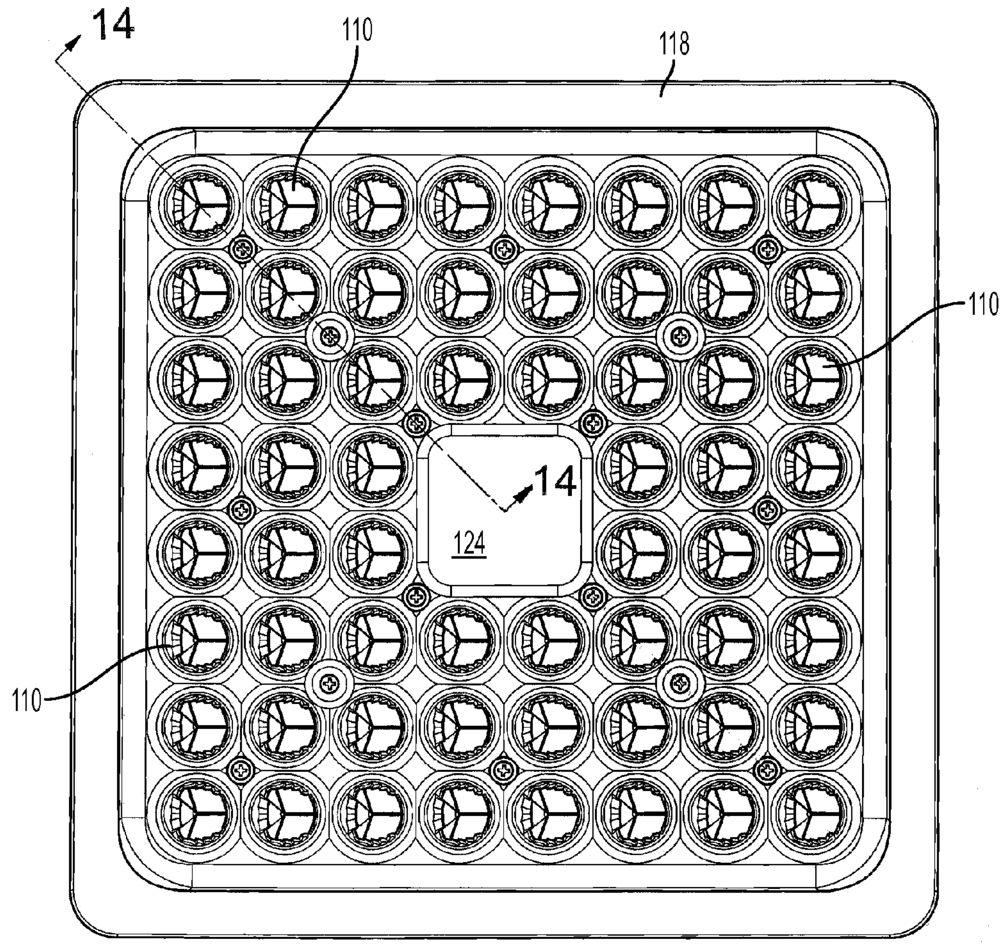
FIG. 12 is a bottom plan detail view of the LED and optics assembly of FIG. 7 having a first configuration of LEDs.
Figure 14:
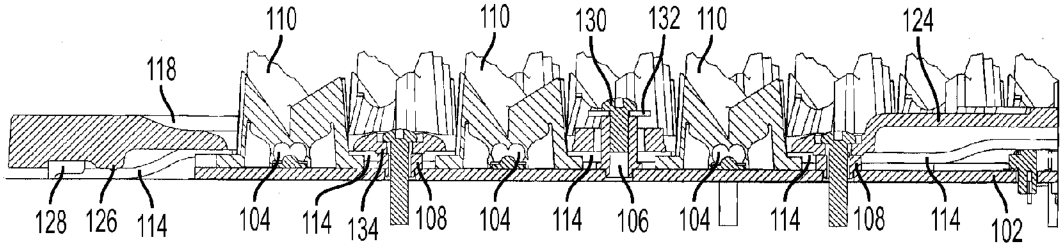
FIG. 14 is a partial sectional view of the LED and optics assembly of the first configuration taken along line 14-14 in FIG. 12.

Bezel 118 has an array of apertures 120 that correspond to the array of lenses 110 and LEDs. FIGS. 9-11 illustrate three different arrays of lenses 110 (and LEDs): sixty in FIG. 9 (and in FIGS. 7 and 8), thirty-six in FIG. 10 and twenty-four in FIG. 11. Application-specific requirements, such as unique illumination levels and/or distributions, could dictate other arrays. Each bezel aperture 120 preferably is countersunk so as to minimize or avoid blockage of light emanating from high beam angle lenses. In the embodiments of FIGS. 10 and 11, the unused locations 122, which cover circuit board areas that are devoid of LEDs and lenses, are aesthetically formed as closed circular blanks. The bezel may also incorporate cavities for accommodating other board-mounted components. A center "hump" 124 provides an internal space for the board-mounted quick-disconnect coupling 109 and an external area for indicia, such as a company logo. The hump space could also house other components, such as a motion detector.

Assembly of LED cartridge 100 involves positioning lenses 110 over the LEDs; placing gasket 114 over circuit board 102 with the lenses 110 protruding through gasket apertures 116; placing bezel 118 over gasket 114 with the lenses 110 protruding through bezel apertures 120; and attaching bezel 118 to circuit board 102 with four assembly screws 130 and four washers 132. Compression of gasket 114 is controlled to ensure uniform sealing performance, to avoid overcompression and resulting damage to the gasket or the lenses, and to avoid undercompression, which could result in areas of non-compression due to warpage or deflection of parts and in undue blockage of light if the bezel is disposed too far from the optic flanges 112.

During cartridge assembly, gasket compression control is afforded by the four taller, threaded standoffs 106, which pass through holes in the bezel 118 and receive assembly screws 130. Screws 130 bottom out on the standoffs 106, allowing the bezel to "float." The height of standoffs 106 is designed to generate only a small amount of gasket compression, or possibly a small clearance, since the purpose is to hold the assembly together for ease of production and field service. However, any clearance should be minimized to keep the lenses 110 from slipping out of position. The threaded standoffs 106 pass through holes in gasket 114 and are sealed by virtue of the gasket hole being slightly smaller than the standoff diameter. This forms a light radial seal, which is adequate protection against moisture and bug entry in the typical downlighting position. When used in a vertical or uplighting position, a more robust seal may be required, for example, foam sealing washers between bezel 118 and washers 132.

Compression control of gasket 114 during cartridge installation on housing 10 is afforded by the twelve shorter standoffs 108 on circuit board 102 and twelve shallow mating standoffs 134 on the underside of bezel 118 through which mounting screws 136 pass (see FIG. 6). Screws 136 may be made captive to bezel 118, if desired. When the cartridge is secured to housing bottom wall 14, these standoffs compress gasket 114 solid between them, separating the bezel 118 and the optic flanges 112 by the appropriate distance. By incorporating compression-limiting standoffs at the screw locations, no undue flexural stress or deflection is induced in the bezel as a direct result of the screw load.

The construction and performance aspects of housing 10 will now be described with reference to FIGS. 5 and 6. The longitudinal length of the housing (between end caps 20) may be tailored to a particular need. For example, a housing longer than that shown in FIG. 6 might be desirable for aesthetic reasons or for practical reasons, such as a higher illumination level. A housing about twice as long as that shown in FIG. 6 will accommodate two LED cartridges 100, providing up to 120 LEDs and an enhanced ability to tailor the light distribution for a particular application. A housing of any desired length can simply be cut from a housing extrusion at the mill and inherently have the same cooling performance per unit length owing to the integral cooling fins 18, which run longitudinally of the housing and extend laterally outwardly and generally horizontally, preferably with a slight downward slope.

Figure 5:
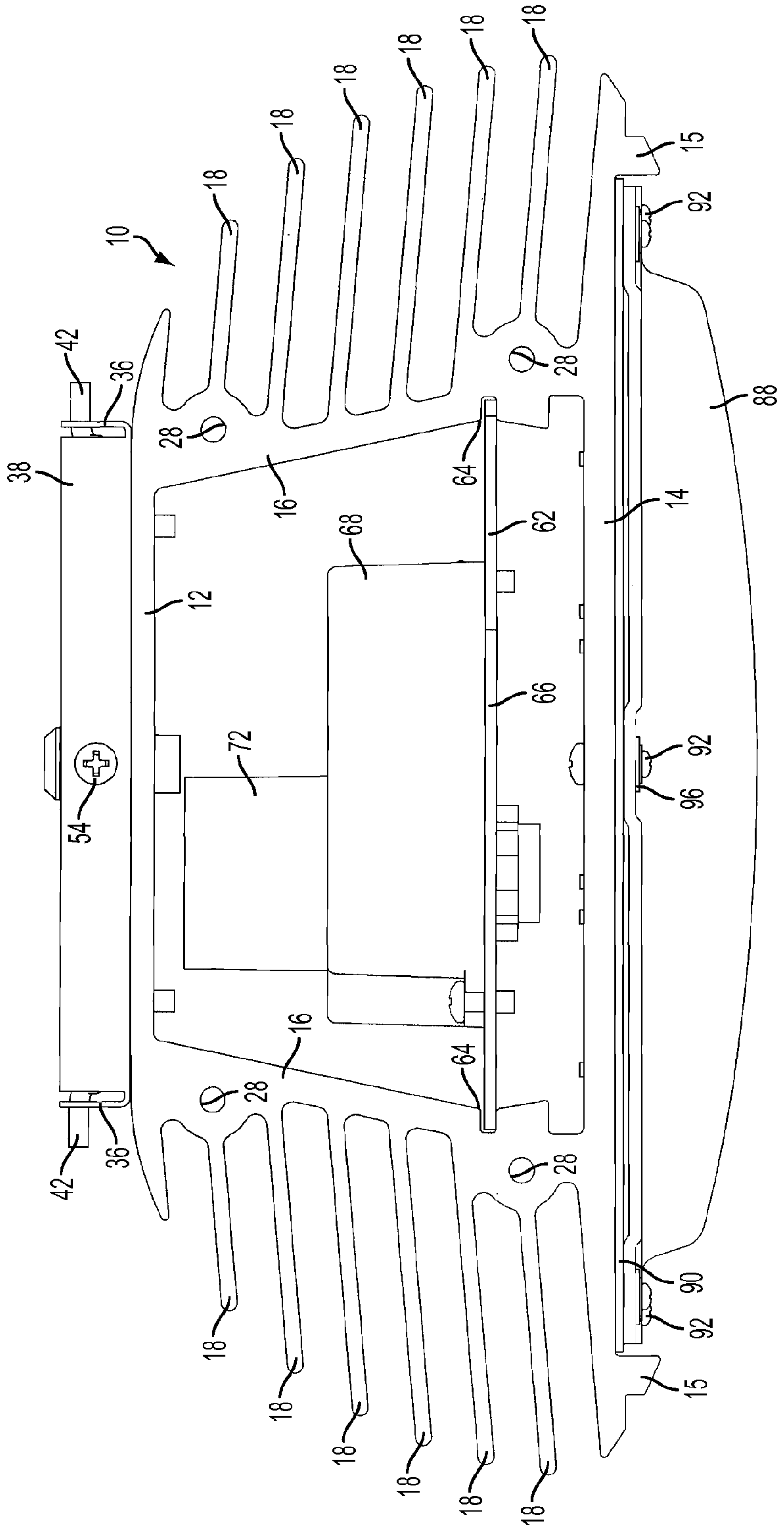
FIG. 5 is an end elevational view of the luminaire of FIG. 1, with the end caps thereof removed.

The transverse profile depicted substantially to scale in FIG. 5 embodies an optimized blend of factors manifested in a luminaire housing having a high thermal performance characteristic owing to the relatively large surface area available for heat dissipation, including the housing core walls 12, 14 and 16 and the cooling fins 18. The housing of this preferred embodiment has cooling fins with a nonuniform reach, which increases progressively and nonlinearly from top wall 12 almost all the way to bottom wall 14, presenting a cascading profile. As used herein, "reach" means the lateral distance of a cooling fin's distal edge from the medial longitudinal vertical plane of the housing. This profile enhances heat dissipation because the distal portions of most of the cooling fins are not directly beneath a superior cooling fin. Further, the distal edges of any group of up to four consecutive cooling fins lie substantially along a constant-radius arc. Stated otherwise, the difference in reach, i.e., the reach differential, between adjacent cooling fins decreases progressively from top wall 12 almost all the way to bottom wall 14. The cooling fins slope laterally downwardly at a shallow angle, preferably about 5 degrees, primarily to facilitate shedding of moisture and entrained dust or debris.

A working example of a housing with this profile, about 12 in. long, has an overall width of about 11.3 in. (the span between the distal ends of the opposed lateral cooling fins having the greatest reach), an overall height of about 3.8 in. (excluding bottom rails 15) and a resulting height-to-width aspect ratio of about 1:3. Bottom wall 14 (excluding the bottom pair of cooling fins) is about 34% wider than top wall 12 (excluding the top pair of cooling fins), while side walls 16 are of equal length. Walls 12, 14 and 16 together define a trapezoidal core having a mean external width of about 5.7 in. (the average width of top wall 12 and bottom wall 14). The lateral cantilevered lengths of the sixteen cooling fins 18 (eight per side), vary from about 0.8 in. to about 2.6 in., most being at least about 2.0 in. long and at least about 35% of the mean external width of the core; and the longest being about two-thirds the overall height of the housing, about 45% of the mean external width of the core and about 23% of the overall width of the housing. As used herein, "lateral cantilevered length" means the distance along a cooling fin from its proximal side wall 16 to its distal edge. Further, the ratio of the lateral cantilevered lengths of the cooling fins to the space between them is in the range of about 2:1 to about 8:1; and the ratio of the total of the cantilevered lengths of all of the cooling fins to the perimeter of the housing core is about 1.7:1. The cooling fins have a smooth finish and slope downwardly at an angle of about 5 degrees to the horizontal; they have the same uniform thickness of about 0.125 in.; and they are uniformly spaced apart by about 0.36 in. The total thickness of the cooling fins on each side wall is not more than about 30% of the overall height of the housing. These dimensional parameters provide the housing with a heat dissipating surface area of at least about 6.9 sq. ft. per longitudinal linear foot of housing.

The above preferences and concomitant advantages notwithstanding, decent thermal performance can be achieved with fewer cooling fins spaced further apart, or with more cooling fins spaced closer together, or with cooling fins having a smaller range of cantilevered lengths, or with cooling fins that do not present a cascading profile or are not downwardly sloped. The lateral cantilevered lengths of the cooling fins should be relatively large so as to provide ample surface area for dissipating much of the heat generated by the LED engine, and the cooling fins should not be so close together that heat dissipation is substantially impeded. Cooling fin thickness may vary laterally from proximal portion (root) toward distal edge, and/or from cooling fin to cooling fin, and the surface may be roughened to enhance heat dissipation. Further, as the cooling fins will shed moisture at any downward inclination or even if substantially horizontal, the downward slope angle, if any, may be less than or greater than 5 degrees but not so steep that heat becomes unduly trapped between the cooling fins.

FIGS. 15-19 depict another luminaire embodiment 138 according to the invention in which components common to those of the previous embodiments are denoted by like reference numbers. Housing 10 of this embodiment has the same transverse profile (see FIG. 5) but is longer than the housing of the previous embodiments. At least one LED cartridge 100 of the type described earlier is mounted to housing bottom wall 14. As before, a removable component tray 62 supports electronic drivers 68 (four instead of the previous two) and a ballast surge protector 72. Component tray 62 also has quick-disconnect couplings in the form of a male connector 140 adapted to mate with a female connector 142, which supplies power from an outside line source via a power cable 143, and a male connector 144 adapted to mate with a female connector 146, which delivers power from the drivers to the LED circuit board 102 via a cable 147.

Luminaire 138 is intended for cantilevered mounting at one end to a support, so it is devoid of a top mount assembly. Instead, the rear end of the housing is closed by an end cap

Figure 23:
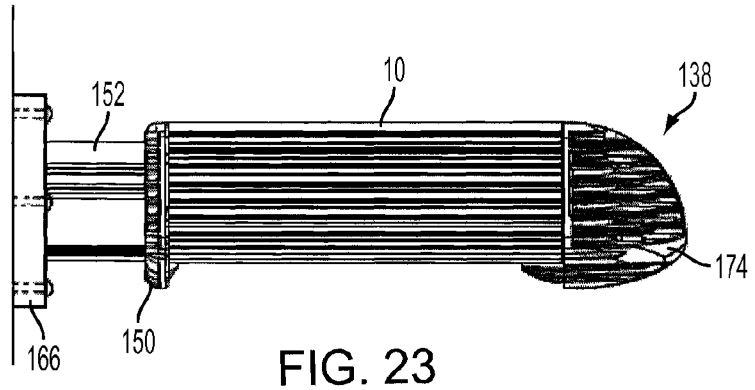
FIG. 23 is a side elevational view of the luminaire of FIG. 15 mounted to a wall.
Figure 24:
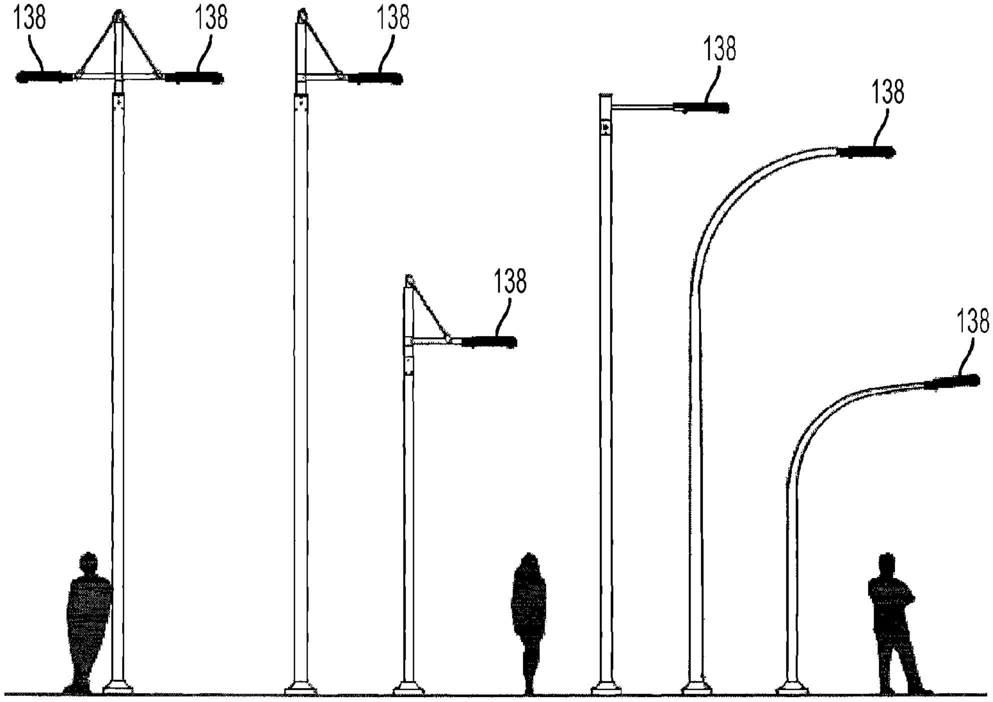
FIG. 24 is a side elevational view of seven luminaires of FIG. 15 mounted on various types of architectural lighting poles.

150 to which a tubular mount 152 is first secured by three screws 154. End cap 150 is secured to the housing with an interposed gasket 22 by four lockwashers 156 and four screws 158. End cap 150 also has a central hole 160 for the passage of power cable 143, and preferably has fins 162 that complement cooling fins 18 on the housing. Six set screws 164 carried by tubular mount 152 serve to fix the mount to a tubular support. FIG. 23 depicts surface mounting of this luminaire to an in-wall junction box (not shown), the installation finished by a screw-on cover 166. FIG. 24 depicts examples of this luminaire mounted to various poles. Cantilevered mounting leaves the flat top surface of the housing free for optional attachment of photocells and/or other control devices.

The front end of the housing may be closed by a similar finned front cover 168, with an interposed gasket 22, by means of a washer 170 and a single screw 172 passing through a center hole 173. Alternatively, a more convex finned front cover 174 may be used. A backing plate 176, secured to front cover 174 by screws 178, has a keyhole-shaped center aperture 180. The front cover 174 (or 173) is hinged to the housing to facilitate tool-less access to the interior of the housing. To that end, and referring to FIGS. 17 and 19, a hinge bracket 182, mounted to housing bottom wall 14 by two screws 184, pivotally retains the two laterally extending hinge pins 186 of a swinging mount 188. Mount 188 has a key-shaped nose piece 190 with a threaded bore 192 that fits into aperture 180 of cover backing plate 176. Screw 172 is threaded into bore 192 to secure the front cover to swinging mount 188. A deflectable, spring-loaded catch button 194 mounted to housing top wall 12 releasably retains swinging mount 188 in the up position, keeping the front cover closed and snug against gasket 22. Pulling the front cover forward by its edges causes catch button 194 to deflect and release swinging mount 188, allowing the front cover to swing down to the open position, where it simply hangs down to allow access to component tray 62. Rotating the open front cover upward and then pressing it rearward causes catch button 194 to deflect and then snap back in front of swinging mount 188, keeping the front cover closed.

Figure 22:
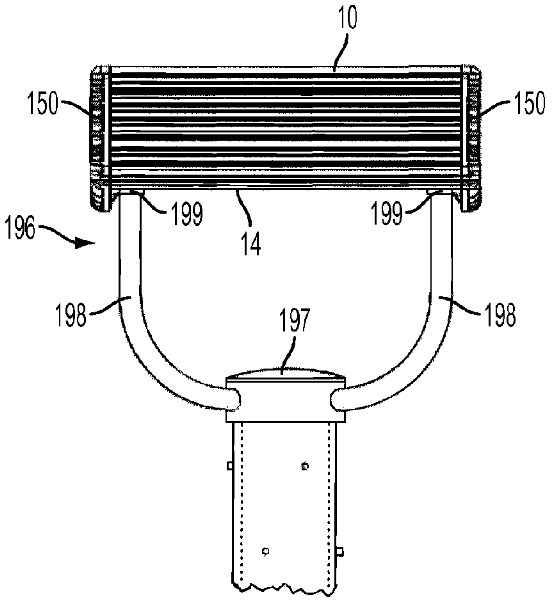
FIG. 22 is a side elevational view of the luminaire of FIG. 1 mounted atop a post via a yoke adapter.

Finally, any of the disclosed luminaire embodiments can be mounted atop a post by means of a yoke adapter 196 (see FIG. 22). The embodiment shown has the same finned cover 150 on each end of housing 10. Yoke adapter 196 has a post-capping base 197, two arms 198 extending upward from the base, and mounting plates 199 atop the arms at opposite ends of the housing 10 that are screwed to housing bottom wall 14 and flank the bottom-mounted LED engine (not shown).

While various embodiments and have been chosen to illustrate the invention, it will be understood by those skilled in the art that various changes and modifications may be made without departing from the scope of the invention as defined by the appended claims.

We claim:

1. A luminaire housing made of thermally conductive material and comprising:

a longitudinally extending core having a substantially flat top wall, a substantially flat bottom wall and two opposite side walls connecting the top wall to the bottom wall, the core having a mean external width and a medial longitudinal vertical plane, and at least five external, vertically spaced, substantially parallel cooling fins carried by each side wall, said cooling fins extending longitudinally and projecting laterally outwardly in a downward slope, each cooling fin terminating laterally in a distal edge and having a lateral cantilevered length and a reach defined by the lateral distance of its distal edge from said medial longitudinal vertical plane, wherein the reaches of a group of at least four consecutive cooling fins of each side wall increase progressively from the top cooling fin of the group to the bottom cooling fin of the group and the lateral cantilevered length of the majority of the cooling fins of each side wall is at least about 35% of the mean external width of the core.

2. The luminaire housing of claim 1, wherein each group comprises at least six consecutive cooling fins.

3. The luminaire housing of claim 2, wherein each cooling fin of each group has a substantially uniform thickness.

4. The luminaire housing of claim 3, wherein all of the cooling fins of each group have substantially the same thickness.

5. The luminaire housing of claim 1, wherein each of the cooling fins of each group slopes downwardly and outwardly at an angle of about 5 degrees from the horizontal.

6. The luminaire housing of claim 1, wherein the reach differential between adjacent cooling fins of each group decreases progressively from the top cooling fin of each group to the bottom cooling fin of each group.

7. The luminaire housing of claim 6, wherein the distal edges of the cooling fins of each group lie substantially along a constant-radius arc.

8. The luminaire housing of claim 1, wherein the cooling fins of each group are substantially uniformly spaced from one another.

9. The luminaire housing of claim 8, wherein the lateral cantilevered length of each of the cooling fins of each group is greater than the space between them.

10. The luminaire housing of claim 9, wherein the ratio of the lateral cantilevered lengths of the cooling fins of each group to the space between them is in the range of about 2:1 to about 8:1.

11. The luminaire housing of claim 1, wherein the overall height of the core is about one-third the span between the distal edges of a pair of cooling fins of opposite side walls having the greatest reach.

12. The luminaire housing of claim 1, wherein the housing is substantially symmetrical about said medial longitudinal vertical plane.

13. The luminaire housing of claim 1, wherein the top wall, the bottom wall, the two opposite side walls and the cooling fins are integrally formed as a unit.

14. The luminaire housing of claim 13, wherein the top wall, the bottom wall, the two opposite side walls and the cooling fins are a unitary extrusion of one piece of material.

15. A luminaire comprising the housing of claim 1, a downwardly facing light emitting diode assembly supported below the bottom wall of the core, and a driver within the core electrically coupled to the light emitting diode assembly.

16. The luminaire housing of claim 1, wherein the lateral cantilevered length of the longest cooling fin of each side wall is about two thirds the overall height of the core.

17. The luminaire housing of claim 16, wherein the lateral cantilevered length of the longest cooling fin of each side wall is about 45% of the mean external width of the core.

18. The luminaire housing of claim 16, wherein the lateral cantilevered length of the longest cooling fin of each side wall is about 23% of the overall width of the housing.

19. The luminaire housing of claim 1, wherein the ratio of the total of the lateral cantilevered lengths of all of the cooling fins to the perimeter of the housing is about 1.7:1.

20. The luminaire housing of claim 1, wherein the total thickness of the cooling fins of each side wall is not more than about 30% of the overall height of the core.

21. The luminaire housing of claim 20, wherein a medial group of cooling fins of each side wall have substantially the same thickness and are substantially uniformly spaced.

22. The luminaire housing of claim 21, wherein the ratio of the space between the cooling fins of each of said medial groups to the thickness thereof is at least about 2.9:1.

23. The luminaire housing of claim 22, wherein each of said medial groups comprises six cooling fins.

24. The luminaire housing of claim 1, wherein some of the cooling fins of each side wall have different lateral cantilevered lengths.

25. The luminaire housing of claim 1, wherein the top wall is narrower than the bottom wall.

26. The luminaire of claim 15, wherein the driver assembly is removably supported by the side walls above the bottom wall.

27. The luminaire of claim 26, wherein the driver assembly is slidably received in and supported by two longitudinally extending internal grooves, one in each side wall.

28. The luminaire of claim 26, wherein the housing is substantially symmetrical about said medial longitudinal vertical plane.

29. The luminaire of claim 26, wherein the top wall, the bottom wall, the two opposite side walls and the cooling fins are integrally formed as a unit.

30. The luminaire of claim 29, wherein the top wall, the bottom wall, the two opposite side walls and the cooling fins are a unitary extrusion of one piece of material.

31. The luminaire of claim 26, further comprising an end cap at each end of the housing configured to cover ends of the top wall, the bottom wall, the two opposite side walls and the cooling fins, at least one of the end caps being removable.

* * * * *